(12) United States Patent  
McDonnell

(10) Patent No.: US 6,705,573 B2  
(45) Date of Patent: Mar. 16, 2004

(54) SURVIVABILITY AND MISSION FLEXIBILITY ENHANCEMENTS FOR RECONNAISSANCE AIRCRAFT

(75) Inventor: William R. McDonnell, St. Louis, MO (US)

(73) Assignee: Advanced Aerospace Technologies, Inc., St. Louis, MO (US)

( * ) Notice: Subject to any disclaimer, the term of this patent is extended or adjusted under 35 U.S.C. 154(b) by 0 days.

(21) Appl. No.: 10/169,425

(22) PCT Filed: Jan. 2, 2001

(86) PCT No.: PCT/US01/00033

§ 371 (c)(1), (2), (4) Date: Jun. 28, 2002

(87) PCT Pub. No.: WO01/50135

PCT Pub. Date: Jul. 12, 2001

(65) Prior Publication Data

US 2002/0190162 A1 Dec. 19, 2002

Related U.S. Application Data

(60) Provisional application No. 60/188,210, filed on Mar. 10, 2000, provisional application No. 60/176,537, filed on Jan. 18, 2000, and provisional application No. 60/174,018, filed on Jul. 23, 1999.

(51) Int. Cl.$^7$ .................................................. F42B 4/26
(52) U.S. Cl. .................. 244/170; 102/336; 102/351; 89/1.11
(58) Field of Search ............................ 244/3, 170, 1 R, 244/121, 129.1; 89/1.11, 1.1; 273/360; 342/13; 102/33 C, 334, 351, 357

(56) References Cited

U.S. PATENT DOCUMENTS

| | | | |
|---|---|---|---|
| 1,913,813 A | 6/1933 | Mirick |
| 1,977,198 A | 10/1934 | Nicolson |
| 3,159,806 A | 12/1964 | Piasecki |
| 3,327,968 A | 6/1967 | Converse |
| 3,362,289 A | 1/1968 | Guin |
| 3,872,375 A | 3/1975 | Ronka |
| 4,354,419 A | 10/1982 | Patterson |
| 4,659,034 A | 4/1987 | Diekmann |
| 5,333,814 A | 8/1994 | Wallis |
| 5,497,156 A | 3/1996 | Bushman |
| 5,722,618 A | 3/1998 | Jacobs et al. |
| 6,055,909 A | 5/2000 | Sweeny |

Primary Examiner—Galen L. Barefoot  
(74) Attorney, Agent, or Firm—Polster, Lieder, Woodruff & Lucchesi LC

(57) ABSTRACT

A pod (34) containing sensors and/or targeting systems such as laser designators or range finders are hung on a cable (30) below an aircraft (12). The line (30) can be reeled in or out similar to towed decoys. This allows the aircraft (12) to operate above or in the cloud cover while the sensors/targeting equipment (34) are operating below the cloud cover to find the enemy forces.

27 Claims, 5 Drawing Sheets

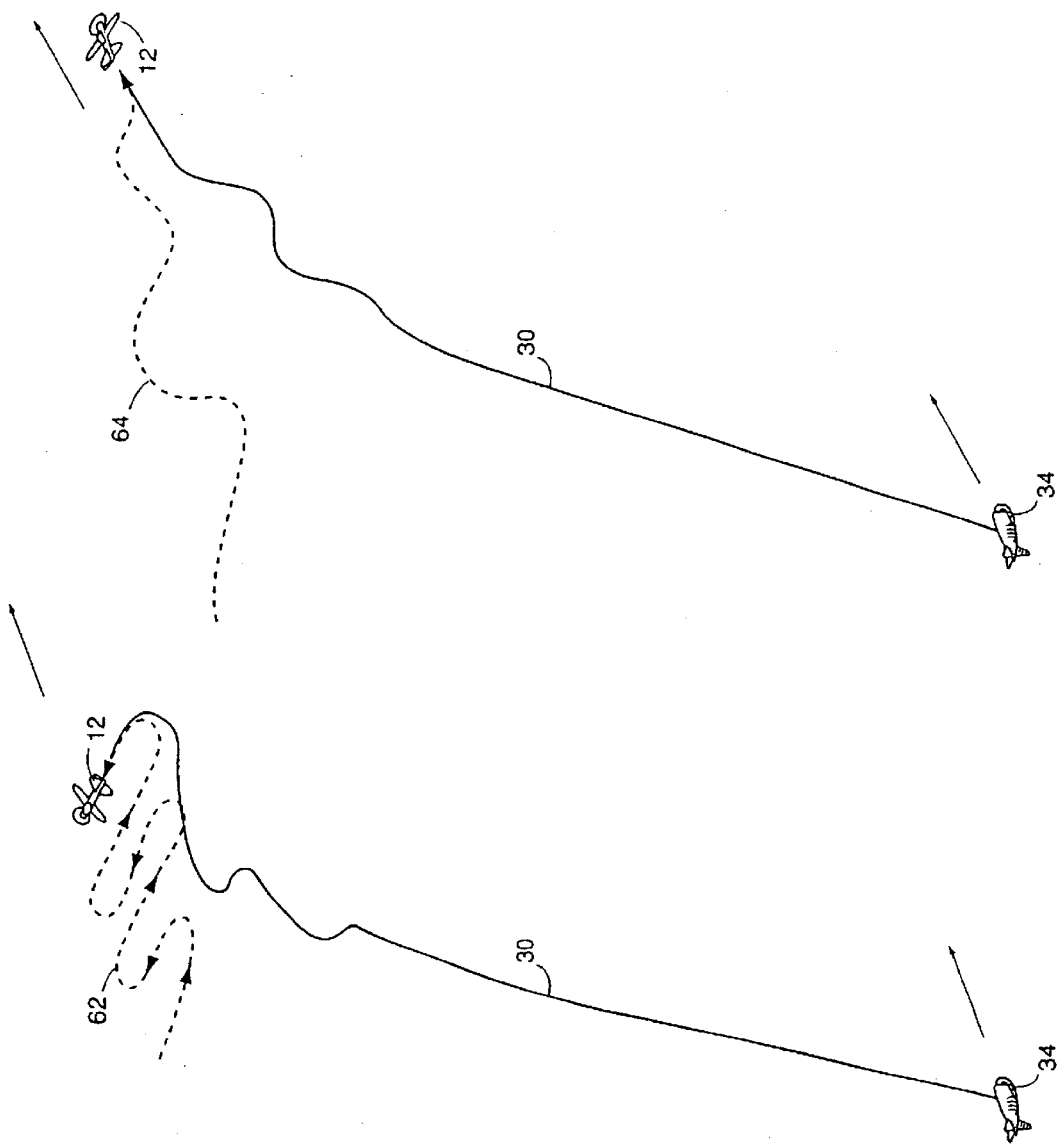

SURVIVABILITY AND MISSION FLEXIBILITY ENHANCEMENTS FOR RECONNAISSANCE AIRCRAFT

CROSS-REFERENCE TO RELATED APPLICATION

This national phase application under 35 U.S.C. §371 of PCT application PCT/US01/00033, claims priority of Provisional Application Nos. 60/174,018, filed Jul. 23, 1999, 60/176,537, filed Jan. 18, 2000, and 60/188,210, filed Mar. 10, 2000.

TECHNICAL FIELD

The present invention relates to heavier than air or lighter than air aircraft where it is desirable for the air vehicle to operate at a higher altitude to stay out of the most effective range of light arms fire and/or to hide behind the natural cloud cover, smoke or atmospheric haze while still being able to get its sensors and targeting systems closer to the ground and beneath the cloud cover, atmospheric haze, fog, smoke, etc. Sensors are also more difficult to make stealthy than other airframe components. This invention also relates to aircraft that want to reduce their signature, draw enemy fire away from the mother aircraft, and/or want to use less expensive non-stealthy sensors without drawing enemy fire to the parent aircraft itself.

BACKGROUND ART

The conflict in Kosovo has highlighted a shortfall in the ability to find camouflaged enemy ground forces under cloud cover, haze or smoke. Both manned and unmanned aerial vehicles (UAVs) must drop below the cloud layer to find enemy forces and/or to laser designate them but become vulnerable when they do as illustrated by the loss of a stealth fighter and numerous UAVs.

The closest analogy to the current invention is Northrop's ROSS (Remotely Operated Sensor System) disclosed in U.S. Pat. No. 5,722,618 dated Mar. 3, 1998. The ROSS system places a sensor stationary near the ground at the end of a long cable below a circling aircraft so as, for example, to get a low enough grazing angle to look into a hangar, under a bridge, etc.

Other somewhat analogous patents are U.S. Pat. Nos. 4,354,419 and 3,362,289.

Until this invention, cloud cover, atmospheric haze, smoke and other phenomena, which obscured visibility, were the most severe naturally occurring limitations to aerial reconnaissance. With this invention these phenomena are turned into an advantage for aerial reconnaissance.

SUMMARY OF INVENTION

The present invention provides improvements in the survivability of aircraft equipped with sensors/targeting equipment by operating the aircraft in a manner to keep it hidden behind cloud cover or other atmospheric phenomenon that block most sensors while placing the aircraft's sensors in a pod suspended on a cable below the cloud cover. The sensor pod is much smaller and harder to visually detect than the rest of the airframe and contains only what is necessary to perform its task without a large infrared source like the aircraft's engine. Even if ground forces are able to detect and shoot at the sensor pod they will be shooting a safe distance aft and below the aircraft and not jeopardizing any flight critical systems. The downing of a stealth fighter in Kosovo has highlighted the fact that even low observable aircraft operating at night are still vulnerable when they drop down below the cloud cover to try to detect targets. Even under circumstances where targets can be detected through the clouds using only a SAR radar for example it is still advantageous to be able to illuminate targets with a laser designator positioned below the cloud layer so laser guided weapons can home in on the target without exposing the aircraft. This laser designator can also be used to illuminate a target to cue other aircraft as to the location of the target which is well known in the art.

Although the current invention can place sensors in a fixed location near the ground and at a low grazing angle relative to an object of interest like the ROSS system the primary purpose of the current invention is to turn cloud cover from a disadvantage for aerial reconnaissance into an advantage by hiding the aircraft behind the clouds and placing the sensors and targeting equipment below the clouds.

The importance of this invention was highlighted during the war in Kosovo with the loss of many UAVs. On one occasion a Predator UAV was shot down and a Hunter UAV was sent over to see what happened to the Predator and it got shot down. Another Hunter was shot down when it was sent over to see what happened to the first two aircraft. Despite the obvious need for a more survivable UAV system no one during or after the Kosovo war thought about using the ROSS system, or unmanned versions of it, to hide the aircraft above or in the clouds and protected from visual and infrared guided weapons while exposing only the sensor pod below the clouds. This was despite the fact that the ROSS system had been flying since at least 1996.

The current invention also differs from ROSS in numerous other ways. The current invention adds a laser designator to the sensor pod to designate targets for laser guided weapons. This laser designator could also be used to cue other aircraft as to the location of the target which is well known in the art. The ROSS system patent proposes every conceivable application for their invention including dropping off humans and taking soil, air or water samples near the target but it never suggests using a laser designator in the pod to designate a target for laser guided bombs or to cue other aircraft. This is probably because they didn't envision the aircraft above any clouds and unable to designate targets from the aircraft itself and thus putting a laser designator in the pod appeared to add no value. However the experience in Kosovo has caused the Air Force to initiate plans to retrofit laser designators onto all their predator UAVs yet no one during or since Kosovo considered adding a laser designator to the sensor pod of a ROSS system.

Also the ROSS system sensor pod was envisioned as operating near the ground where targets of interest are located and didn't envision the aircraft operating in or above the clouds. As a result there was no consideration that the cable would be in the clouds and thus would need an anti-ice capability. Also the ROSS system patent also never envisioned sensors and/or methods for making sure the aircraft was hidden and thus protected by the clouds from ground based visual and infrared guided weapons. Also no sensors and/or methods were envisioned for keeping the sensor pod below the clouds and/or not farther below the clouds than necessary to perform their reconnaissance function. Placing the sensor pod farther below the clouds than necessary especially when the aircraft is flying in a straight line to cover more ground significantly increases the cable drag and requires more cable length than necessary. In one embodiment of the current invention cable drag is also reduced by having a power source onboard the sensor pod to eliminate the need to transmit power down the cable and allow a smaller diameter cable.

The ROSS system didn't address minimizing cable and sensor pod drag since the sensor pod was intended to be used while stationary in the air near the ground observing targets whereas the current invention is intended to be useable by a higher flying aircraft and both while stationary but more often while translating to cover more ground. The ROSS sensor pod was made aerodynamically draggy on purpose to help make the cable more stable during recovery. For the current invention the sensor pod is preferably streamlined to minimize the cable sweep back angle and maximize the vertical separation between the aircraft and the sensor pod in translational flight with a fixed length of cable. The sensor pod also wants to be streamlined because draggy shapes, such as spheres, towed through the air tend to be unstable and jump around resulting in a poor sensor platform. The current invention also preferably uses tail fins on the sensor pod to stabilize it using the airstream and a gimbaled sensor system so that the operator can point the sensors in the desired direction relative to the pod.

The ROSS patent, U.S. Pat. No. 5,722,618, disclosed a circling flight path for the host aircraft to keep the sensor pod stationary. The current invention discloses a zig-zag flight path to be used when a larger vertical separation is desired with a limited length of cable but it is desired to keep translating horizontally at a significant speed without significant vertical oscillations of the pod. The current invention unlike the ROSS system is also envisioned to achieve some of the advantages of a towed decoy system by reeling the cable out the right distance to draw radar guided weapons away from the aircraft and toward the sensor pod.

Various preferred embodiments of my invention are disclosed herein. Some of them locate laser designators closer and in clearer view of targets than the parent aircraft. Some reduce the signature of the parent aircraft by remotely locating the sensors and/or targeting equipment. Some allow less expensive, less stealthy sensors/targeting equipment without drawing enemy fire to the parent vehicle. Some use the aircraft's sensors/targeting equipment as a decoy for the parent vehicle. Some provide a streamlined sensor pod with a roll-theta or azimuth-elevation gimbaling system for the sensors. Some minimize the drag and length of the tow cable required in order to place sensors in view of ground targets yet hide the aircraft behind cloud cover.

In accordance with some of the preferred methods of the present invention, a zig-zag flying pattern for the parent aircraft is provided so as to reduce cable drag, and achieve greater vertical separation between the parent aircraft and the sensor pod without excessive vertical oscillations of the sensor pod. In some of the methods, the aircraft is operated to best hide behind or in clouds and a way is provided to minimize the vertical separation between the aircraft and pod and still get the full protection desired.

Other aspects of the invention will best be understood in light of the following descriptions of the best modes for carrying out the invention.

BRIEF DESCRIPTION OF DRAWINGS

FIG. 5 shows a zig-zag flight profile for slowly towing sensor pods at large vertical displacements below the aircraft.

FIG. 6 shows a zig-zag flight profile like FIG. 5 but modified for translating faster while towing the sensor pod.

BEST MODES FOR CARRYING OUT THE INVENTION

Figure 1:
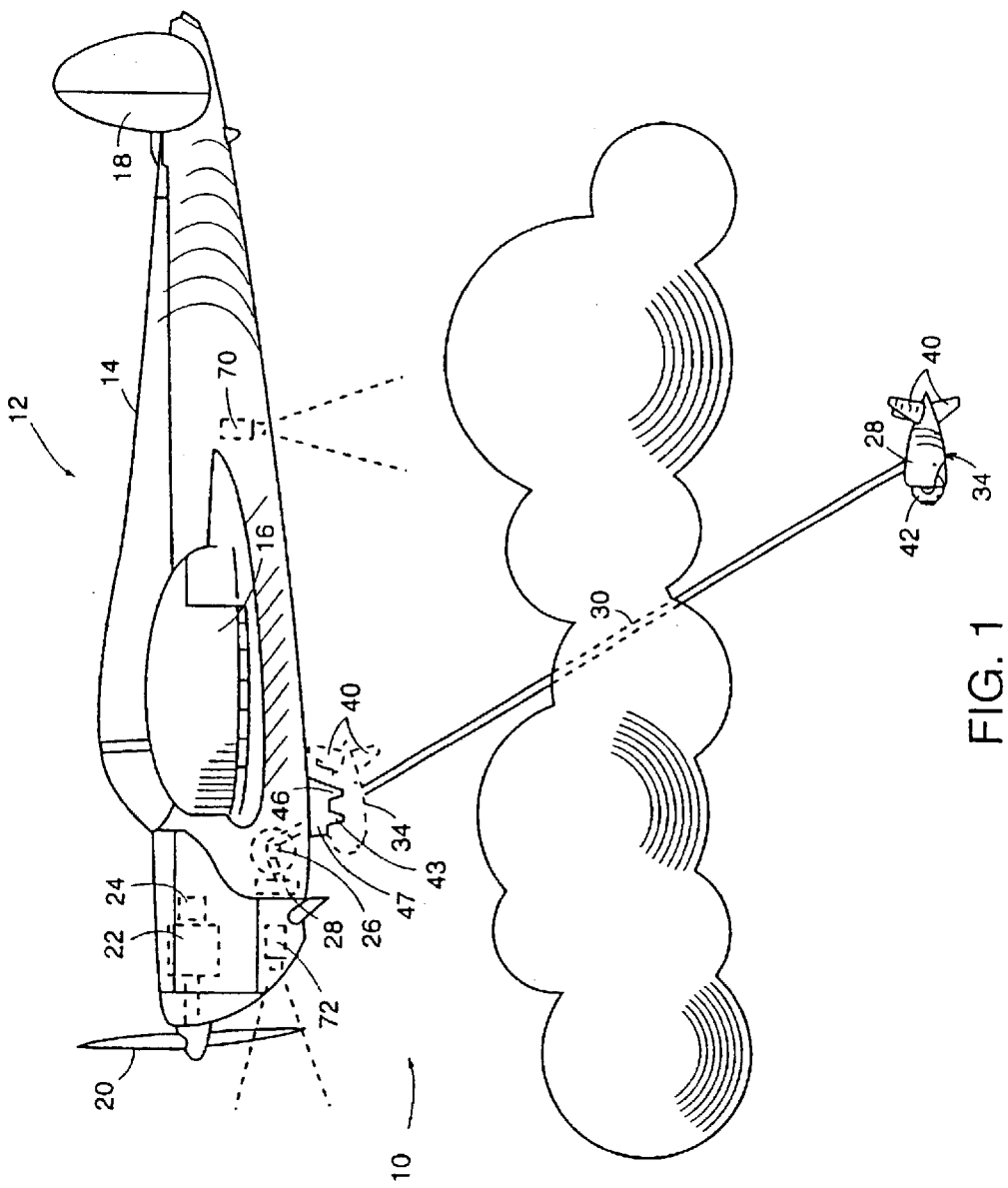
FIG. 1 is a side view of the aircraft showing the sensors/targeting equipment pod in both a retracted and extended position.

Referring now by reference numerals to the drawings and first to FIG. 1, the aircraft system is generally indicated by 10 and consists of an aircraft 12 and an extendable sensor/targeting pod 34 shown in its extended position in solid lines and in its retracted position in dashed lines. The aircraft 12 includes a fuselage 14, wings 16, horizontal and vertical tail 18, propeller 20, engine 22, generator 24, winch 26, tow line 30 and data links 28. The pod 34 has stabilizing fins 40 and contains a roll-theta sensor and laser designator gimbaling system 42 as is well known in the art and similar to systems such as used on the Lockheed Martin AAS-38B FLIR pod. Power for the pod 34 is provided by airframe mounted generator 24 through copper lines (not shown) in tow line 30 as is well known in the art for towed decoy systems. It is also understood of course that the pod could contain its own battery or own generator. In fact for very long fiber optic cables and very small sensors an onboard battery will be the preferred approach due to the added complexity and difficulty of transmitting power over thousands of feet of cable and increasing the tow line diameter and thus aerodynamic drag levels.

There are many ways that the airframe 14 can send commands down to the pod 34 and the pod 34 can send video imagery back to the airframe 14, but the preferred method is through a fiber optic cable which again is well known in the art for towed decoys. Again, for very long tow lines the fiber optic cable also provides the thinnest line to keep drag to a minimum. For high structural strength, very small diameter high strength steel cable can be used along with the fiber optic cable. It is also understood that a streamlined cable cross-section could be used as disclosed in U.S. Pat. No. 4,354,419, but this complicates the system.

For certain applications such as when the aircraft 12 is unmanned, a wireless direct line-of-sight data link (not shown) in the aircraft 12 can communicate with a ground station. Commands from this ground station are communicated to the aircraft 12 and through data link 28 to the sensor pod 34 to control the sensors. Likewise video imagery from sensors in sensor pod 34 are transmitted up to the aircraft 12 through data link 28 and through the wireless data link to the ground station. In this way data can travel back and forth from the sensor pod 34 to the ground station even when the sensor pod 34 is too low to be in direct line-of-sight communications with the ground station.

The sensor pod 34 can be reeled back in prior to landing where it is stabilized by forward saddle 43 and aft saddle 46 at the bottom end of pylon 47 which is a well known approach for towed vehicles. Other approaches are of course possible for example the sensor pod can be retracted into a padded cavity in the underside of the airframe fuselage 14 or the sensor pod can be dropped prior to landing for re-use such as is known in the art for towed decoys or can be dropped into an advantageous position for continued reconnaissance such as into a tree, onto power lines or skyscrapers. For this later case of course a wireless communication link is desired. A cable cutter or other disconnect means which is known in the art can be used to cut or disconnect the cable either at the aircraft 12 or at or near the sensor pod 34. The latter approach retains the fiber optic cable 30 with the aircraft 12.

Figure 2:
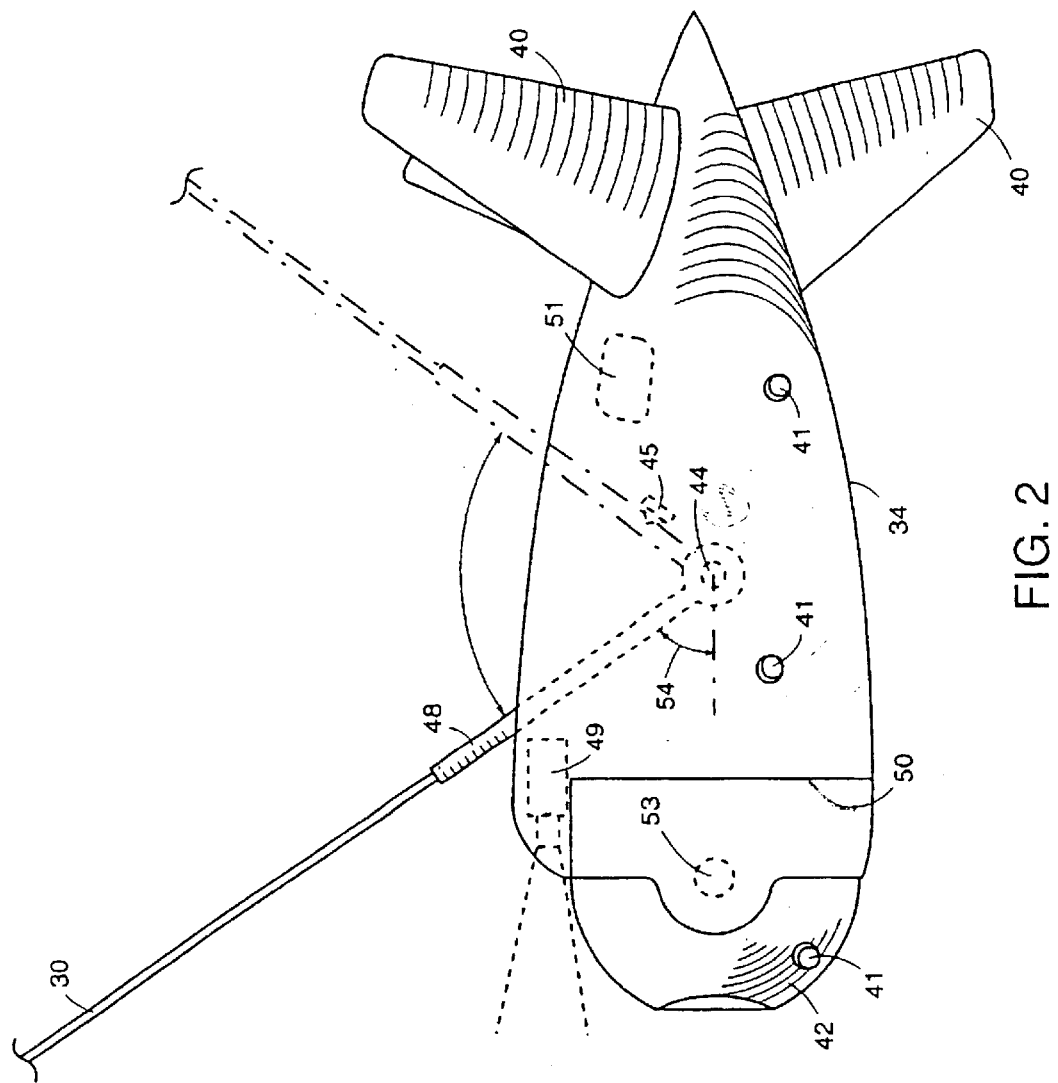
FIG. 2 is a close-up side view of the pod with a roll-theta sensor turret.

FIG. 2 is the side view of one possible configuration for a sensor pod 34. It consists of target acquisition sensors such as EO/IR cameras, possibly an acoustic sensor and a laser designator mounted on a roll-theta gimbal 42 similar to other streamlined units on high speed aircraft such as the Lockheed Martin AAS-38B FLIR pod on the F/A-18. The sensors can be pointed up or down by rotating the sensors about axis 53 and the entire turret can also roll from line 50 forward in order to look in different directions. Three stabilizing fins 40 clocked approximately 120 degrees apart may be fixed or all-moving surfaces as is common on fighter aircraft horizontal stabilizers. The fins are used to move the aerodynamic center of the pod behind the center of gravity so the pod will weathervane into the relative wind for a streamlined and stable platform. Although other approaches are possible, aerodynamic surfaces on the rear of the pod are the preferred means to perform this function.

The tow line 30 is attached to the sensor pod at the center of gravity 44 with a pivoting attachment 48 that travels in a slot and allows the tow line to angle forward or aft from the vertical. An actuator (not shown) would be optional but could be used to force pivoting attachment 48 forward so that the tension on the cable 30 would provide a nose up moment and the tail fins 40 would provide lift. Or by forcing the attachment 48 aft the aft fins would provide a negative lift. If it was advantageous to drop the sensor instead of reel it in and it was decided to have a cable cutter at the sensor pod 34 instead of at the aircraft 12 then a blade element 45 could be placed so that it severs the fiber optic cable through an opening in the side of the pivoting attachment 48 as pivoting attachment 48 is pushed to its far aft location and into contact with the blade element 45 by the previously described actuator. Another option of course is to have the cable 30 connected at a fixed point on the exterior above the center of gravity of the sensor pod 34 as is often done with towed vehicles.

Roll-theta gimbaled systems are one way to provide a low drag configuration but tend to limit the aft viewing to within 30 degrees of straight aft. The use of the pivoting attachment 48 and the all moving fins allows the pod to be pointed nose down in order to see farther aft. Azimuth-elevation gimbaling, phased array or fixed sensors are of course also possible with this invention. Although not necessary a fixed forward facing camera 49 is shown that could be used to detect the bottom of the cloud layer so as to maintain the proper altitude just below the clouds or detect obstacles or the ground level to maintain ground clearance. It will also be advantageous to have a GPS system 51 in the pod or at least a GPS antenna that can relay the signal up to the aircraft 12 for calculating the exact location of the sensor pod.

Figure 3:
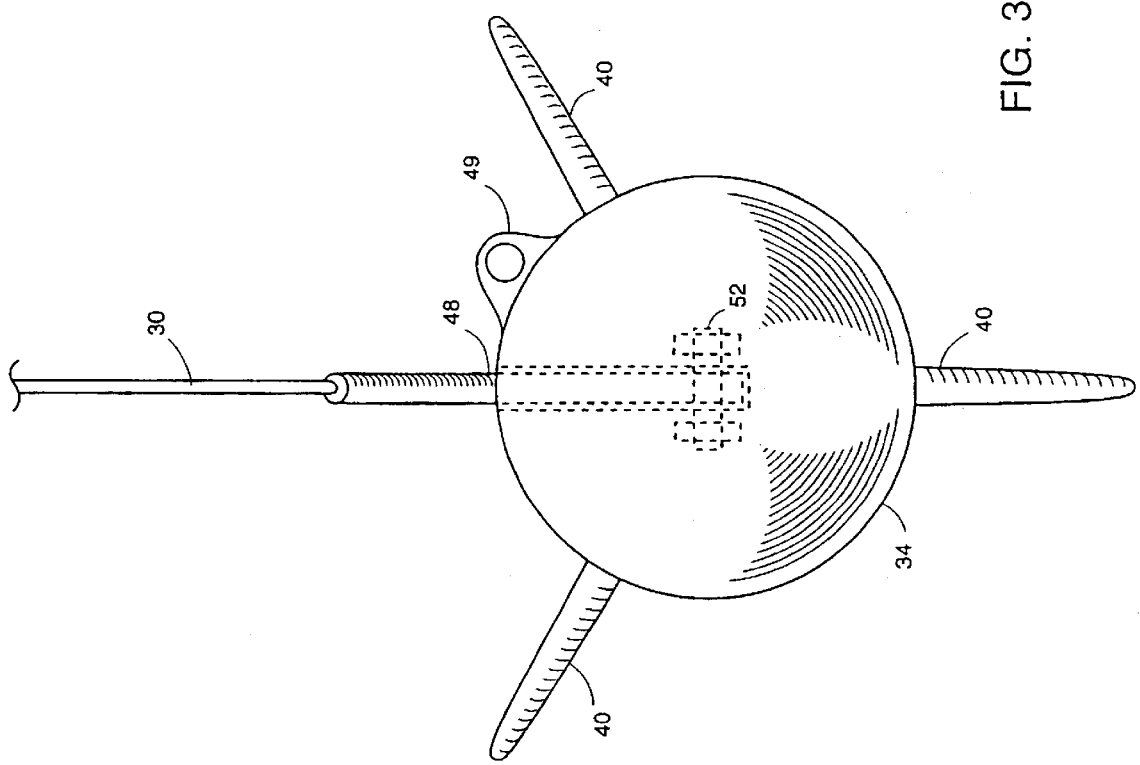
FIG. 3 is a close-up frontal view of the pod.

FIG. 3 shows a frontal view of the sensor pod 34 equipped with three all moving stabilizing fins 40. The tow line 30 is attached to the sensor pod 34 through pivoting attachment member 48 and bolt 52.

Although the sensor pod 34 is shown without wings it is understood that it could be equipped with wings to generate a downward load to get a larger displacement below the aircraft 12 if desired or produce positive lift to maneuver or raise up quickly such as to avoid a ground obstacle, obtain a better view, avoid detection or reduce cable drag by raising the sensor pod up closer in altitude to the aircraft 12.

If wings are used, especially on a small sensor pod, the wings would either be designed to look like those of a bird or the wings would be see-through plastic since the weight of the sensor pod is less critical to this system than being as stealthy as possible. Any configuration could also have small lights 41 on the body such as seen in FIG. 2 which for the human eye tend to cancel out the darker image of the rest of the sensor pod against the sky and make the system harder to see. The light intensity emanating from these lights 41 can be manually adjusted or could be controlled by a light sensor similar to that used on cameras which would be located on the opposite side of the pod from the light 41 that it controls and designed to measure the background lighting intensity. The lighter the sky behind the sensor pod 34, the brighter the desired intensity of the light 41 and the higher the voltage applied to the light. Although a non-stealthy pod shape 34 is shown it is understood that other shapes are possible.

Figure 4:
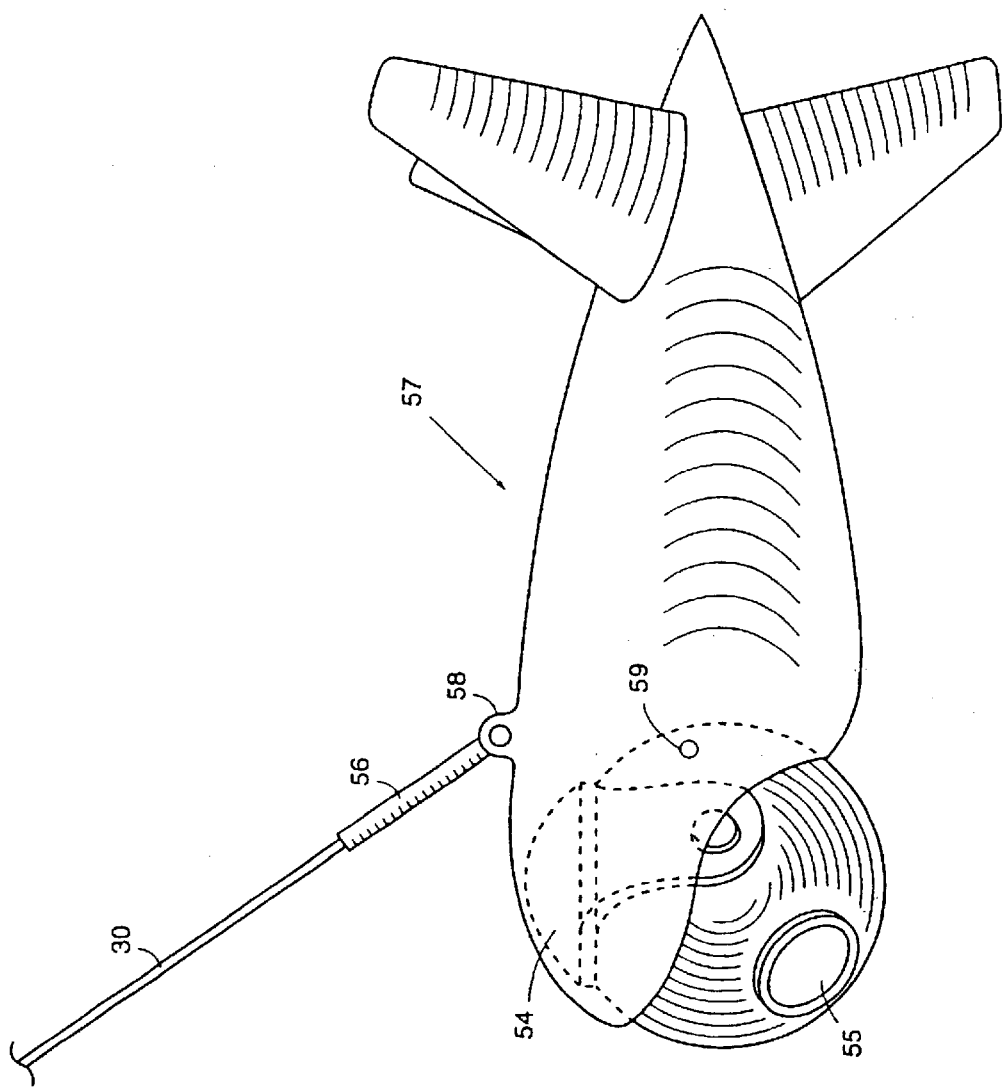
FIG. 4 is a close-up side view of an alternate pod design with an azimuth-elevation sensor turret.

A side view of a sensor/targeting pod 57 that uses a roll-theta turret 54 and sensors designed to look out of window 55 is shown in FIG. 4. Currently more sensor/targeting pods on unmanned aerial vehicles use this gimbaling approach. This pod 57 also shows a different design for towing where the towing cable 30 and rod 56 connect to the pod at a hinge point 58 located above the pod's center of gravity 59. Again an actuator may or may not be used to control the angle of sweep back or sweep forward of rod 56 at hinge point 58. Using this approach some pitch stability is achieved due to the center of gravity 59 hanging below the hinge point 58 which could allow smaller or perhaps even no fins in the lateral axis of the sensor pod 57 especially if a mechanical damper is used at hinge 58.

The flight pattern of the aircraft 12 can also be used to reduce cable 30 drag and also place the sensor pod 34 at the greatest vertical distance below the aircraft 12. Prior art disclosed flying the aircraft 12 in a tight circle 60 so the sensor pod 34 can be made to effectively stop and hang in the air with the cable 30 near vertical and the sensors at their maximum vertical displacement below the aircraft 12. This was previously disclosed in U.S. Pat. No. 5,722,618. This approach can also be used for the current invention. However a zig-zag flight pattern is preferred in order to translate horizontally yet still achieve a large vertical displacement between the sensor pod 34 and the aircraft 12 as shown by flight pattern 62 in FIG. 5. To translate faster the zig-zag pattern can be modified with more gradual turns and/or smaller turn angles so the aircraft 12 is pointed closer to the desired direction of travel for more of the time such as shown by flight pattern 64 in FIG. 6. This makes it easier to control the altitude of the sensor pod than alternating between circling and traveling in a straight line. This is due to the fact that the more the aircraft 12 turns back toward the trailing sensor pod the more the sensor pod 34 will tend to drop and the more the sensor pod 34 will tend to rise again when the aircraft 12 again turns away from the trailing sensor pod 34.

The sensor pod 34 can be raised by reeling back in the cable 30, gaining altitude or airspeed with the aircraft 12, by translating faster or by flying a wider zigzag pattern and can be lowered by doing the opposite. If a very constant sensor pod 34 altitude is desired during these maneuvers then the aircraft 12 either needs to slow down, descend or let out the cable the more it heads away from the sensor pod 34 and visa-versa.

There are times, however, when it will be desired to rapidly lower the sensor pod to get a closer look at an object. If the aircraft 12 is towing a sensor pod in a straight line or a zig-zag and sees an object it wants to look at closer, it can circle around which if a long length of cable is being used causes the sensor to drop lower for a closer look. The aircraft 12 may have to increase speed, climb or reel in the cable, increase lift on the sensor pod 34 wings or turn in a larger diameter circle, etc. in order not to let the sensor pod 34 contact the ground.

Being able to hide the aircraft 12 from passive detection may force the adversary to turn on his radar to try to counter this threat. This then exposes the adversary's radar sites to detection and triangulation by radar locating systems on board the aircraft 12 and/or pod 34 and/or other aircraft located in the area.

By relocating the sensors away from the aircraft and into the sensor pod 34, the radar signature of the aircraft 12 is reduced, and also the sensor pod can act to draw any radar guided weapons away from the aircraft like a towed decoy. The length of the tow line 30 can be adjusted to maximize the sensor pod's effectiveness as a towed decoy against certain threats though the optimum distance for radar threats is classified.

It is also understood that the signature of the sensor pod 34 could be increased and tailored with the use of repeaters and other equipment typical of towed decoys in order for the sensor pod 34 to act even more like a towed decoy. Alternatively the repeater antenna could be placed on the tow line 30 or be attached and trail behind the tow line 30 on its own separate tow line (not shown). A third approach is to have a towed decoy reel out from the back of the sensor pod 34 to trail behind the sensor pod 34 on its own tow line.

There are three different basic cloud cover conditions that this invention might operate in which will be discussed here. The first is a solid continuous cloud cover condition. The second is one in which there are holes in the clouds and the third is where the clouds are scattered.

In cloud cover condition number one the aircraft only needs to make sure that the sensor pod 34 is low enough to be in view of the ground or targets of interest and that the aircraft is not. The first problem is to make sure the sensor pod 34 is in view of the ground. There are numerous ways in which to do this.

A first is to use the forward looking sensor 49 on sensor pod 34 as shown in FIG. 2. If the image from this sensor 49 is obscured by the cloud then the UAV operator knows that the sensor pod 34 is in the clouds and the pod 34 needs to be lowered as described before such as by the aircraft descending, the winch cable reeling out further, the aircraft slowing down or flying zig-zag patterns such as shown in FIGS. 5 and 6, or reducing the lift or creating greater negative lift on the sensor pod 34 wings, if any are used, in order to get the sensor pod 34 below the clouds. If the sensor pod is already below the clouds then the forward looking sensor 49 can detect the bottom of the clouds as they approach so that the altitude can be adjusted in anticipation to keep the sensor pod 34 below the clouds. Without a forward looking sensor and without the targeting sensors 42 pointed forward it is more difficult to anticipate changes in the height of the cloud layer however whenever the image from the targeting sensors 42 gets obscured by the clouds the operator knows that the sensor pod 34 needs to descent. It will be understood that there are other possible systems to detect the bottom of the cloud layer such as a dew point detector on the tow line 30, laser reflection off the clouds, etc.

The second part of the problem is making sure that the aircraft 12 remains hidden by the clouds. There are also several solutions to this problem. A first is to use the forward looking sensor 49 on the sensor pod 34 to keep the sensor pod 34 close enough to the bottom of the clouds to assure that the aircraft is in or above the clouds. A second approach is to give this sensor 49 a high enough field of view that it could see the aircraft if it was too low and in view from the sensor pod and thus in view also from the ground.

A third approach is to have an electro-optical (E.O.), infra-red (I.R.) or other kind of sensor 70 on the aircraft 12 that is mounted to look down. If this sensor can see the ground then the pilot of the aircraft knows that a similar type of enemy sensor on the ground can see the aircraft and the aircraft needs to gain altitude. Both sensors 70 and 49 can be inexpensive since their resolution can be crude and still perform the desired function. Sensor 49 can also be used for sensor pod ground or obstacle collision avoidance.

A fourth approach is to use a forward and/or downward pointing sensor 72 that is used to fly the aircraft above the top of the clouds. This may result in the aircraft being higher than it has to be to avoid detection from the ground but it may be the preferred approach during icing conditions for an aircraft that doesn't have a good enough anti-icing capability to want to spend much time in the clouds.

The tow line can be kept ice free in several ways. Transmitting power down the tow line to the sensors in the pod will naturally tend to heat up the line but if this isn't enough a separate heating element in the line or transmitting the power through the steel cable or other structural element in the cable that has a higher electrical resistance can provide the necessary heating. An alternative is to vibrate or bend the tow line to break off the ice which can be done by maneuvering the aircraft up and down as in a porpoising maneuver. As the aircraft noses over the tow line will become unloaded and due to drag will tend to bend back in the middle. When the aircraft pulls up again the line will tend to straighten out more again.

The function of sensors 72 and 70 of course could be performed by a pilot if the aircraft is manned.

In cloud condition number one, left and right turns can be made without worrying about the locations of the clouds; however, in cloud condition number two where there are holes in the clouds this isn't true. In this case the aircraft will want to fly around these holes in the clouds to avoid detection from the ground. The locations of the holes can be detected by an external source such as satellites or other aircraft but preferably will be detected using sensor 49 on the sensor pod 34 and/or sensor 72 which is a forward and downward looking sensor mounted on the aircraft 12. Sensor 49 is more valuable for this purpose since the sensor pod 34 will always be below the cloud cover and able to see forward whereas sensor 72 may often be in and not above the clouds. However sensor 72 can also be used to keep the aircraft just above the clouds if there is concern about flying in the clouds due to icing conditions while still maximizing the potential that the sensor pod 34 will be below the clouds. Sensor 49 or 72 may be an E.O. or I.R. sensor and may also be the sensor used to land or takeoff the aircraft 12 or may be a laser radar or other sensor to detect holes in the clouds. When a hole in the clouds is detected in the flight path of the aircraft a left or right turn is initiated to fly around it. It will also be understood that this same aircraft could already have a pretty good feel for the locations of the holes in the clouds by having previously mapped out the locations while flying at a higher altitude and then adjusting for wind drift and using GPS to accurately know its position relative to the holes in the clouds.

In cloud condition number three, where clouds are spotty, the aircraft 12 may have to keep turning to stay hidden in a cloud until it has seen everything it wants to see in that area and must make a dash to another cloud. If the aircraft knows where the enemy is or is likely to be on the ground then it can descent to a cloud or climb away from a cloud keeping the cloud between the aircraft and the enemy location on the ground until the aircraft is out of range of the enemies weapons. At this point it can translate at the higher altitude out of range of the enemies weapons but in view of the enemy until it is again shielded by a cloud and can again descend down into that cloud to further detect and designate targets for attack by itself or other aircraft. If it doesn't know the enemy location on the ground but is concerned about the threat it can spiral up out of a cloud to achieve the maximum altitude before it would be detected or conversely rapidly dive down into a cloud.

It was previously mentioned that the wings on the sensor pod 34 could be used to help control the altitude of the sensor pod 34. It should also be noted that a variable drag device such as a speed brake (not shown) as is known in the art could also be used on the sensor pod 34 to vary its altitude when the sensor pod is in translational flight. By increasing the drag of the sensor pod 34 the pod would trail farther behind the aircraft 12 and would rise in altitude or visa-versa. Also it will be understood that a drag or lift device could be placed on the cable 30 and perform the same function.

It is also possible to use the wings on a sensor pod 34 to maneuver the sensor pod 34 left or right. This is achieved by banking the sensor pod 34 with ailerons or differential wing incidence if all moving wings are used as is known in the art in order to produce a side component of lift. If negative lift is being generated by the wings then the sensor pod 34 would bank in the opposite direction to a conventional aircraft so that a roll to the right would cause the vehicle to turn to the left and visa-versa.

An alternative way to maneuver the sensor pod 34 left or right independent of the aircraft 12 is to generate side forces in other ways such as by yawing the sensor pod 34 with for example the aft vertical fin and generating aerodynamic side forces on the fuselage and any fixed vertical fins mounted forward of the tail fins 40. Alternatively adjustable all-moving vertical fin(s) forward of the tail fins could provide the desired side force without necessarily yawing the fuselage of the sensor pod 34. The forward all-moving fins used to steer laser guided bombs and some missiles is an example of how this can work. It will also be understood that a side force producing device such as a vertical fin could be placed on the cable 30 to generate the desired side force for maneuvering the sensor pod 34.

What is claimed is:

1. A process for rendering an aircraft survivable during reconnaissance or targeting, the process comprising minimizing the time that said aircraft can be seen by electro-optical, infra-red, or visual sensors on the ground by seeking out clouds and operating said aircraft in or above said clouds while towing one or more suspended electronic sensors in a pod on a cable below said aircraft and below said clouds in view of said electro-optical, infra-red, or visual sensors on the ground.

2. The process of claim 1 further comprising maneuvering said aircraft to keep said aircraft hidden from electro-optical, infra-red, or visual sensors below said aircraft while maintaining said sensors in said pod in view of the ground.

3. The process of claim 2 further comprising increasing said aircraft's altitude when said aircraft is close enough to the bottom of the clouds to be detected by electro-optical or infra-red, sensors below said aircraft.

4. The process of claim 3 in which said aircraft detects it is too close to the bottom of the clouds when said aircraft's pilot or electro-optical or infra-red sensors can see the ground.

5. The process of claim 3 in which said aircraft detects when said aircraft is too low by when said aircraft can be seen by electro-optical or infra-red sensors in said pod.

6. The process of claim 3 in which said aircraft's pilot or onboard sensors are used to detect the top of the clouds and adjust the altitude to stay just above the clouds.

7. The process of claim 2 further comprising lowering said sensor pod when the electro-optical or infra-red sensors in said pod cannot see the ground.

8. The process of claim 2 further comprising raising or lowering said sensor pod using a forward looking camera in said pod to keep said sensor pod below the bottom of the clouds or other obscurants.

9. The process of claim 2 in which:
   a) said sensor pod is maintained below the clouds or other obscurants,
   b) said aircraft is flown high enough within or above said clouds or other obscurants to stay hidden from said sensors on the ground below said aircraft, and
   c) said aircraft maneuvers left or right to avoid openings in the clouds or other obscurants and stay hidden from said sensors below said aircraft.

10. The process of claim 9 in which:
    a) said aircraft contains a pilot and/or forward looking sensor that can see forward to detect holes in said clouds or other obscurants.

11. The process of claim 9 in which said pod contains a forward looking sensor to detect holes in the clouds or other obscurants.

12. The process of claim 1 further comprising flying said aircraft above the clouds during icing conditions and maintaining the sensor pod below said clouds.

13. The process of claim 12 in which said aircraft maneuvers to bend said tow line and shed ice from said tow line.

14. The process of claim 1 in which:
    a) said aircraft contains an air-to-ground data link for communicating with a ground station;
    b) said aircraft is flown at a high enough altitude for line of sight communications with said ground station;
    c) said pod is lowered to a point where said pod does not have line of sight with said ground station; and
    d) information obtained from sensors in said pod is transmitted up to said aircraft and then relayed to said ground station through said air-to-ground data link.

15. The process of claim 1 in which:
    a) said aircraft contains an air-to-ground data link for communicating with a ground station;
    b) said aircraft is flown at a high enough altitude for line of sight communications with said ground station;
    c) said pod is lowered to a point where said pod does not have line of sight with said ground station; and
    d) commands from said ground station are relayed to said aircraft through said air-to-ground data link and then down to said pod to control the operation of said sensors.

16. The process of claim 1 in which said tow line connecting said pod to said aircraft is extended and maintained at a suitable distance for said pod to act as a towed decoy for said aircraft in drawing radar guided missiles away from said aircraft.

17. The process of claim 1 in which a fixed forward looking camera on said sensor pod is used for ground/obstacle avoidance.

18. The process of claim 1 in which said aircraft flies a zig-zag pattern to translate horizontally yet achieve a large vertical displacement between said sensor pod and said aircraft.

19. The process of claim 1 in which aerodynamic lift is used to maneuver said sensor pod.

20. The process of claim 1 in which said tow line is de-iced by porpoising maneuvers of said aircraft.

21. The process of claim 1 further comprising minimizing the length of said tow line required to place said sensor pod below the clouds and place said aircraft high enough within or above the clouds to make said aircraft undetectable from below by electro-optical or infra-red sensors.

22. The process of claim 1 wherein
said pod has an aerodynamic center behind its center of gravity to keep said pod pointed into the relative wind.

23. The process of claim 1 wherein said sensors in said pod are capable of selectively looking in different directions relative to said pod.

24. A survivable aircraft system for reconnaissance and targeting designed to hide behind clouds and other obscurants comprising
 (a) an aircraft,
 (b) a pod containing sensors,
 (c) a tow line connecting said sensor pod to said aircraft, and
 (d) a heating element positioned to prevent ice build up on said tow line.

25. A process for increasing the survivability or stealth of an aircraft consisting of selecting the time or location of operation of said aircraft to increase the period of time that the aircraft is hidden from electro-optical, infra-red, or visual sensors external to said aircraft by operating in or behind clouds or other atmospheric obscurants while an electronic sensor connected to said aircraft by a tow line is maintained in potential view of electro-optical, infra-red, or visual sensors external to said aircraft.

26. The process of claim 25 in which said pod electronic sensor is suspended below said aircraft.

27. A survivable aircraft system for reconnaissance or targeting designed to hide behind clouds and other obscurants comprising
 (a) an aircraft,
 (b) a pod containing sensors, said pod having one or more small lights on its exterior to reduce its visual signature, and
 (c) a tow line connecting said sensor pod to said aircraft.

* * * * *